Dec. 29, 1925.  
F. C. BROWN  
BRAKE EQUALIZER  
Filed Nov. 14, 1924    2 Sheets-Sheet 2
1,567,787
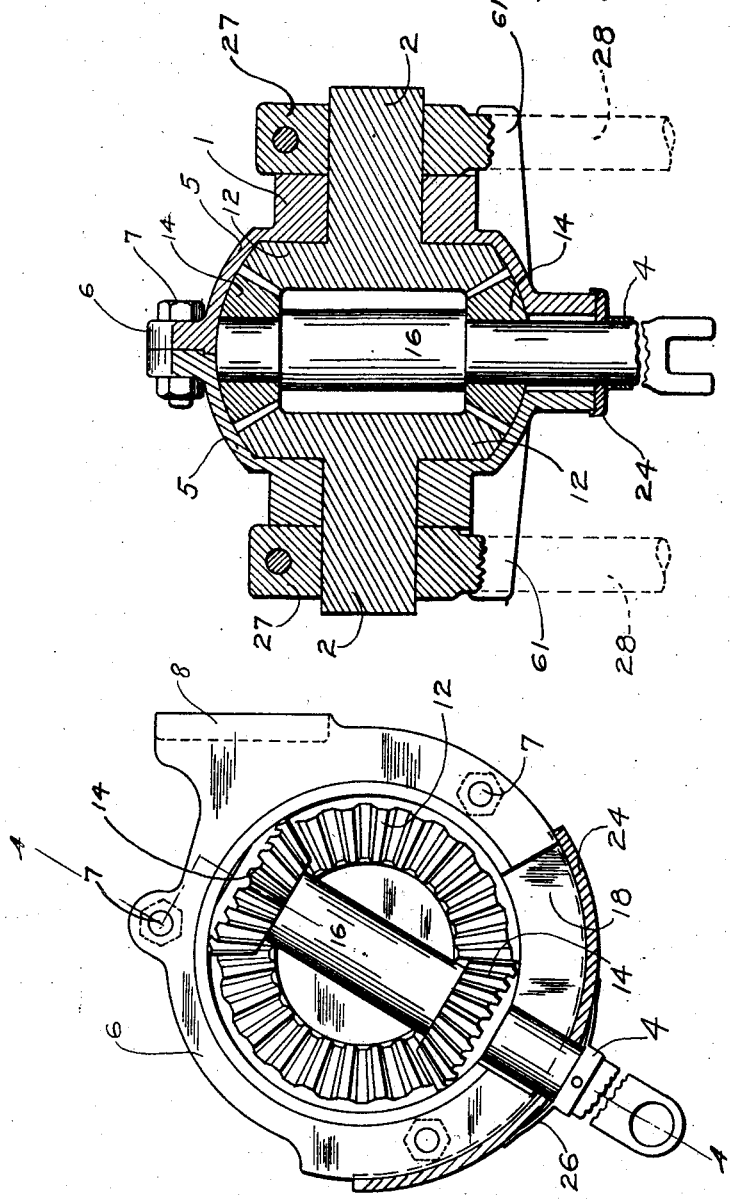
Inventor  
Fred C. Brown.
By Milo B. Stevens Co,  
Attorneys Patented Dec. 29, 1925.

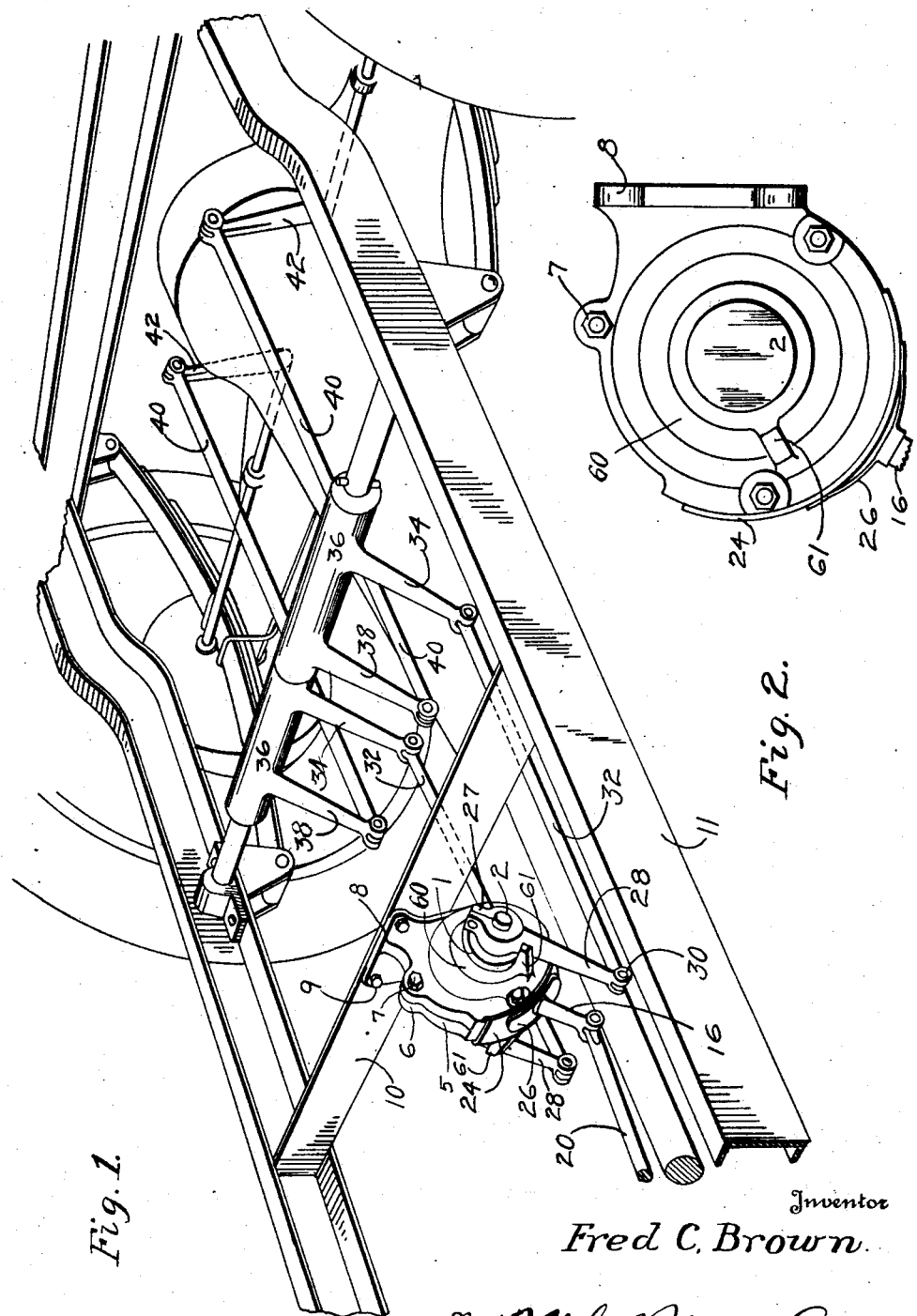

1,567,787

UNITED STATES PATENT OFFICE.

FRED C. BROWN, OF EVERGREEN PARK, ILLINOIS.

BRAKE EQUALIZER.

Application filed November 14, 1924. Serial No. 749,994.

*To all whom it may concern:*

Be it known that I, FRED C. BROWN, a citizen of the United States, residing at Evergreen Park, in the county of Cook and State of Illinois, have invented new and useful Improvements in Brake Equalizers, of which the following is a specification.

This invention relates to brake equalizers especially adapted for use on automobiles, and is an improvement over the construction illustrated in my Patent No. 1,525,604, issued February 10, 1925.

Briefly stated, an important object of this invention is to provide a brake equalizer which will bring about the uniform application of all the brakes on a motor car and will thereby prevent skidding and excessive wear on the tires.

A further object of the invention is to provide a brake equalizer having simple means whereby dust is excluded and whereby the turning of the arms of the equalizer is limited.

A further object is to provide a brake equalizer of the character specified which is of highly simplified construction as compared with the construction illustrated in the aforesaid patent, and which is durable in use and cheap to manufacture.

Other objects and advantages will be apparent during the course of the following description.

In the accompanying drawings forming a part of this application and in which like numerals are employed to designate like parts throughout the same, Figure 1 is a perspective of the improved brake equalizer applied;

Fig. 2 is a side elevation of the improved equalizer;

Fig. 3 is a vertical sectional view through the brake equalizer;

Fig. 4 is a vertical transverse sectional view taken on line 4—4 of Fig. 3.

In the drawing wherein for the purpose of illustration is shown a preferred embodiment of the invention, the numeral 5 designates a pair of more or less similarly formed sections, the meeting portions of which have flanges 6 which abut each other and which are connected by screw bolts 7 or other suitable fastening devices. Fig. 1 illustrates that the flanges may be provided at one side of the improved equalizer with a pair of extensions to form a bracket or attaching plate 8 which may be secured as indicated at 9 to one of the cross bars 10 of the chassis 11. It is thus seen that the improved equalizer may be secured to the intermediate portion of the frame of the automobile, but it is to be understood that the brake equalizer is capable of use any place where it may be advantageously employed. This, of course, will depend largely on the design of the motor vehicle.

The housing formed by the meeting sections 5 is provided with a pair of hubs or bearing members 1 to rotatably receive the spindles or axles 2 of a pair of beveled gears 12.

In carrying out the invention a single pair of pinions 14 are confined between the beveled gears 12 and are, of course, in mesh with the same. These pinions 14 are rotatably mounted on a stout shaft 16, the lower portion of which is extended through an arcuate slot 18 in the bottom of the housing and is provided with means whereby the same may be connected to a main operating member 20. The link 20 may be extended from a foot pedal, a hand lever, or other control device.

Fig. 3 and 4 illustrate that an arcuate cover plate 24 extends over the opening or slot 18 to close the same and is mounted upon and is movable with the shaft or arm 16. A leaf spring 26 has its intermediate portion connected to the shaft 16 by a collar 4 and this leaf spring holds the closure plate 24 closely in contact with the adjacent portion of the housing, but at the same time permits this plate to slide along the housing with the arm 16.

The spindles 2 of the gears 12 are extended beyond the bearings 1 and have connection with the attaching portions 27 of a pair of cranks 28. The lower portions of the cranks 28 have pivotal connection as indicated at 30 with links 32, the rear portions of which are connected with cranks 34 on sleeves 36. The sleeves 36 are also provided with cranks 38 having connection with links 40 which extend rearwardly to the brake operating cranks 42.

Figs. 1 and 2 plainly illustrate that the outer sides of the sections 5 are provided with reinforcing ribs 60 which terminate in laterally projecting arms 61 arranged in the path of travel of and adapted to limit the turning of the depending cranks 28, It is important to note that the pinions 14 and the beveled gear 12 are held in position solely by the housing composed of the sections 5 and in the operation of the device when the link 20 is operated the arm 16 will be turned to cause the pinions 14 to ride about one or both of the beveled gear 12 and thereby bring about the uniform application of the brakes.

Having thus described the invention, what is claimed is:—

1. A brake equalizer comprising a housing consisting of a pair of sections having transversely curved outer walls and bearings, gears arranged in said housing and contacting with said transversely curved outer walls, said gears being provided with spindles extending through said bearings, a single pair of pinions in said housing and engaged with said curved walls, a single arm connected to said pair of pinions, said housing being provided with an elongated slot receiving said arm, and a longitudinally curved plate carried by said arm and extending over said slot.

2. A brake equalizer comprising a housing consisting of a pair of sections having transversely curved outer walls and bearings, gears arranged in said housing and contacting with said transversely curved outer walls, said gears being provided with spindles extending through said bearings, a single pair of pinions in said housing and engaged with said curved walls, a single arm connected to said pair of pinions said housing being provided with an elongated slot receiving said arm, a longitudinally curved plate carried by said arm and extending over said slot, and a leaf spring carried by said arm and having its terminal portion engaged with said longitudinally curved plate to hold the same lightly in contact with the adjacent portion of said housing.

In testimony whereof I affix my signature.

FRED C. BROWN.